US007734585B2

(12) United States Patent
Sharma et al.

(10) Patent No.: US 7,734,585 B2
(45) Date of Patent: Jun. 8, 2010

(54) UPDATEABLE FAN-OUT REPLICATION WITH RECONFIGURABLE MASTER ASSOCIATION

(75) Inventors: Amit Sharma, Fremont, CA (US); Daniel Shih, San Jose, CA (US); Uppili Srinivasan, Fremont, CA (US); Quan Zhou, Alameda, CA (US); Satishkumar Venkatasamy, Tamil Nadu (IN)

(73) Assignee: Oracle International Corporation, Redwood Shores, CA (US)

( * ) Notice: Subject to any disclaimer, the term of this patent is extended or adjusted under 35 U.S.C. 154(b) by 652 days.

(21) Appl. No.: 11/292,949

(22) Filed: Dec. 2, 2005

(65) Prior Publication Data

US 2006/0155778 A1 Jul. 13, 2006

Related U.S. Application Data

(60) Provisional application No. 60/632,922, filed on Dec. 3, 2004.

(51) Int. Cl.
*G06F 17/00* (2006.01)

(52) U.S. Cl. ..................................... 707/623

(58) Field of Classification Search ............... 707/1–10, 707/100–104.1, 200–206
See application file for complete search history.

(56) References Cited

U.S. PATENT DOCUMENTS

| 6,587,856 | B1 | 7/2003 | Srinivasan et al. | |
|---|---|---|---|---|
| 6,615,223 | B1 | 9/2003 | Shih et al. | |
| 6,748,374 | B1 | 6/2004 | Madan et al. | |
| 6,834,286 | B2 | 12/2004 | Srinivasan et al. | |
| 7,313,598 | B1 * | 12/2007 | Sheth | 709/211 |
| 7,571,180 | B2 * | 8/2009 | Minyailov | 707/102 |
| 7,617,289 | B2 * | 11/2009 | Srinivasan et al. | 709/209 |
| 2001/0051948 | A1 | 12/2001 | Srinivasan et al. | |
| 2002/0062346 | A1 | 5/2002 | Chen | |
| 2002/0068559 | A1 | 6/2002 | Sharma et al. | |
| 2002/0104018 | A1 | 8/2002 | Singhani et al. | |
| 2002/0147611 | A1 * | 10/2002 | Greene et al. | 705/1 |
| 2002/0165986 | A1 * | 11/2002 | Tarnoff | 709/246 |
| 2002/0174191 | A1 * | 11/2002 | Robertson et al. | 709/217 |
| 2002/0188486 | A1 | 12/2002 | Gil et al. | |
| 2002/0188513 | A1 | 12/2002 | Gil et al. | |
| 2002/0188729 | A1 | 12/2002 | Zhou et al. | |
| 2003/0028585 | A1 * | 2/2003 | Yeager et al. | 709/201 |
| 2003/0059004 | A1 | 3/2003 | Jiang et al. | |
| 2003/0154305 | A1 * | 8/2003 | Bethmangalkar et al. | 709/245 |
| 2003/0223060 | A1 | 12/2003 | Graf et al. | |
| 2004/0002329 | A1 | 1/2004 | Bhatia et al. | |
| 2004/0085968 | A1 | 5/2004 | Chen et al. | |
| 2004/0085969 | A1 | 5/2004 | Chen et al. | |
| 2004/0165592 | A1 | 8/2004 | Chen et al. | |
| 2004/0205064 | A1 | 10/2004 | Zhou et al. | |

(Continued)

*Primary Examiner*—Diane Mizrahi
(74) *Attorney, Agent, or Firm*—Vista IP Law Group, LLP.

(57) ABSTRACT

A system, method, computer program and article of manufacture for updateable fan-out replication with reconfigurable master association in a large, multi-node LDAP environment. A replication ring supports the addition of fan-out nodes as children to each primary node that sits on a replication ring. The fan-out nodes can be cascaded in multiple parent/child relationships and can support full replication or a subset of the parent data. Each child/parent relationship is defined by an agreement. Each fan-out node replicates changes to their immediate children and parent based upon the change details and the configured agreement, distributing the replication load.

24 Claims, 6 Drawing Sheets

U.S. PATENT DOCUMENTS

| | | |
|---|---|---|
| 2004/0243576 A1 | 12/2004 | Shrivastava et al. |
| 2005/0125525 A1 | 6/2005 | Zhou et al. |
| 2005/0149726 A1 | 7/2005 | Joshi et al. |
| 2005/0165807 A1 | 7/2005 | Srinivasan et al. |
| 2005/0289652 A1 | 12/2005 | Sharma et al. |
| 2006/0067227 A1 | 3/2006 | Batni et al. |
| 2006/0069780 A1 | 3/2006 | Batni et al. |
| 2006/0101081 A1 | 5/2006 | Lin et al. |
| 2006/0147010 A1 | 7/2006 | Batni et al. |
| 2006/0155777 A1 | 7/2006 | Shih et al. |
| 2006/0155778 A1 | 7/2006 | Sharma et al. |
| 2006/0165059 A1 | 7/2006 | Batni et al. |
| 2006/0168136 A1 | 7/2006 | Bethlehem et al. |
| 2006/0200453 A1 | 9/2006 | Santrosyan et al. |
| 2006/0218147 A1 | 9/2006 | Shrivastava et al. |
| 2007/0003032 A1 | 1/2007 | Batni et al. |
| 2007/0003046 A1 | 1/2007 | Batni et al. |
| 2007/0005738 A1 | 1/2007 | Alexion-Tiernan et al. |
| 2007/0038459 A1 | 2/2007 | Zhou et al. |
| 2007/0116253 A1 | 5/2007 | Batni et al. |
| 2007/0204169 A1 | 8/2007 | Bahl et al. |
| 2008/0010349 A1 | 1/2008 | Cai et al. |
| 2008/0016546 A1 | 1/2008 | Li et al. |
| 2008/0043973 A1 | 2/2008 | Lai et al. |
| 2008/0076395 A1 | 3/2008 | Bhatia et al. |
| 2008/0097971 A1 | 4/2008 | Chen et al. |
| 2008/0172429 A1 | 7/2008 | Lin et al. |
| 2008/0175250 A1 | 7/2008 | Chen et al. |
| 2008/0208719 A1 | 8/2008 | Sharma et al. |
| 2008/0208938 A1 | 8/2008 | Lin et al. |
| 2008/0209505 A1 | 8/2008 | Ghai et al. |
| 2008/0209506 A1 | 8/2008 | Ghai et al. |
| 2008/0235298 A1 | 9/2008 | Lin et al. |
| 2008/0294648 A1 | 11/2008 | Lin et al. |
| 2008/0301453 A1 | 12/2008 | Shih et al. |
| 2009/0005116 A1 | 1/2009 | Sharma et al. |
| 2009/0043582 A1 | 2/2009 | Zhou et al. |
| 2009/0055501 A1 | 2/2009 | Wang et al. |
| 2009/0182946 A1 | 7/2009 | Zhou et al. |

* cited by examiner

UPDATEABLE FAN-OUT REPLICATION WITH RECONFIGURABLE MASTER ASSOCIATION

RELATED APPLICATION

This application claims the benefit of U.S. Provisional Application No. 60/632,922, entitled "UPDATEABLE FAN-OUT REPLICATION WITH RECONFIGURABLE MASTER ASSOCIATION", filed Dec. 3, 2004, which is hereby incorporated by reference in its entirety.

BACKGROUND AND SUMMARY

This invention relates to computer systems, and more particularly to replication of data.

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

One type of database application for which data replication is particularly useful is the replication of data for directory information systems. Directory information systems provide a framework for the storage and retrieval of information that is used to identify and locate the details of individuals and organizations, such as telephone numbers, postal addresses, and email addresses.

One common directory system is a directory based on the Lightweight Directory Access Protocol ("LDAP"). LDAP is an object-oriented directory protocol that was developed at the University of Michigan, originally as a front end to access directory systems organized under the X.500 standard for open electronic directories (which was originally promulgated by the Comite Consultantif International de Telephone et Telegraphe "CCITT" in 1988). Stand alone LDAP server implementations are now commonly available to store and maintain directory information. Further details of the LDAP directory protocol can be located at the LDAP-devoted website maintained by the OpenLDAP Organization at http://www.openldap.org.

LDAP directory systems are normally organized in a hierarchical structure having entries organized in the form of a tree, which is referred to as a directory information tree ("DIT"). The DIT is often organized to reflect political, geographic, or organizational boundaries. A unique name or ID (which is commonly called a "distinguished name") identifies each LDAP entry in the DIT. An LDAP entry is a collection of one or more entry attributes. Each entry attribute has a "type" and one or more "values." Each entry belongs to a particular object class. Entries that are members of the same object class share a common composition of possible entry attribute types.

Some LDAP replication systems utilize a replication ring. The replication ring is a loop of primary LDAP nodes which replicate the same LDAP object across the nodes. FIG. 1A shows replication ring 100, and primary nodes 102, 104, and 106. To add a node to the replication ring, a new node takes its place on the ring such as primary node 108. Each primary node pushes its changes to each of the other primary nodes. Thus, each node pushes each change n−1 times, where n is the number of nodes. In a system with a large number of nodes, the replication process can be burdensome on each node. A solution is needed to add new nodes to a replication ring without creating additional replication burden to the existing nodes.

Another drawback to some replication systems is that each node must be identical. This required updating to data on each node that may not be required on each node. This is burdensome and inefficient.

One embodiment for adding new nodes to a replication ring without burdening the existing master nodes includes creation of fan-out nodes, where fan-out nodes are nodes that do not have to be placed on the replication ring.

DETAILED DESCRIPTION OF INVENTION

The present solution is directed to replication of data in an LDAP multi-node environment. One embodiment involves the creation of fan-out nodes, and redirecting changes at the fan-out node to its primary node.

Figure 2A:
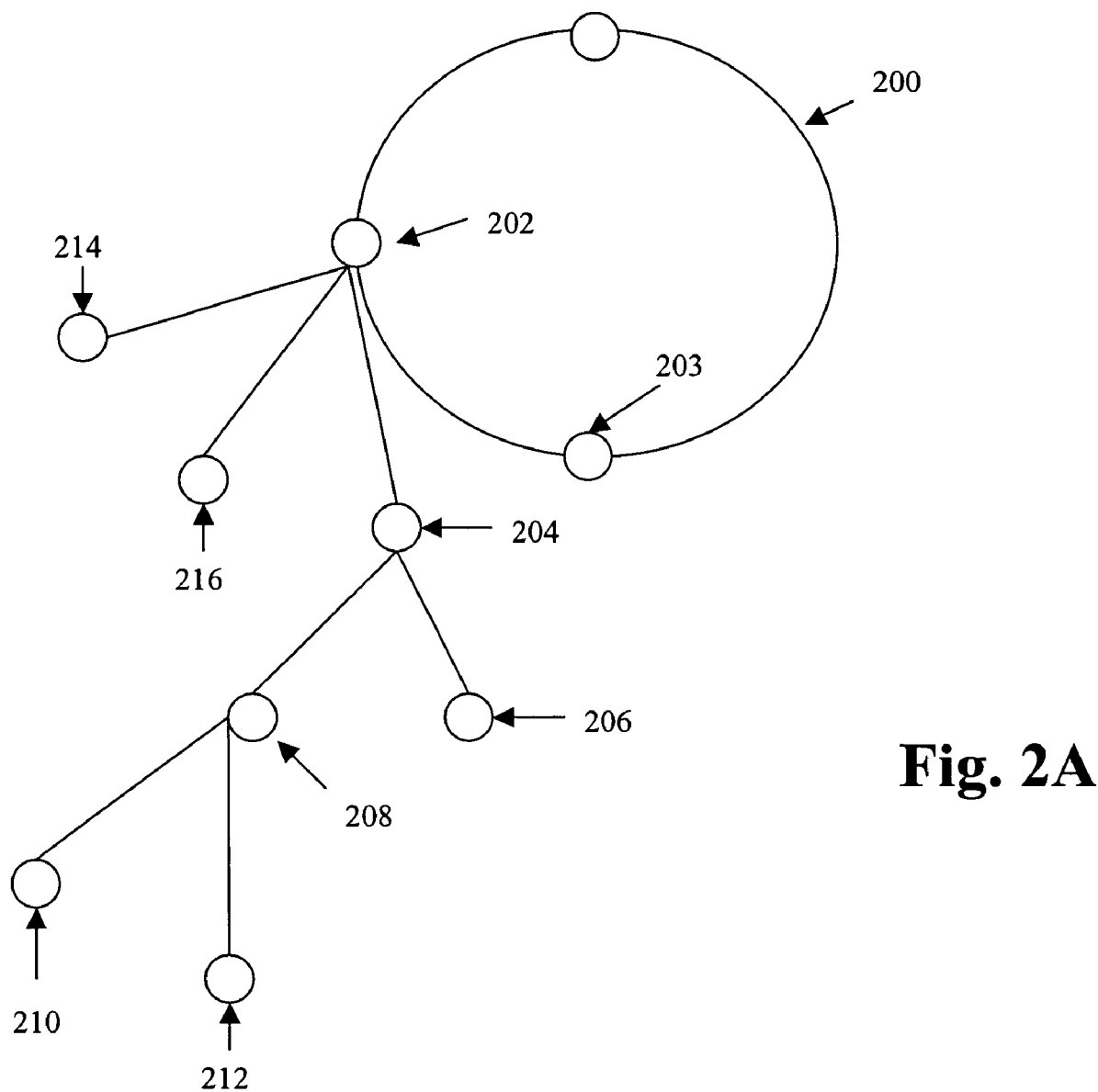
FIG. 2A is a representation of a replication ring with fan-out nodes.

In some embodiments a replication ring is a communication ring on which sit one or more nodes to be replicated. Nodes that sit directly on the replication ring are referred to as master nodes, or primary nodes. A primary node can have child nodes referred to as fan-out nodes. A fan-out node is a node in a replication network that does not sit on the replication ring. Each fan-out node can be a child to a primary node or a parent or a child to other fan-out nodes. An example embodiment of this parent/child relationships is shown in FIG. 2A. Note this simplified illustration shows a small number of levels of nodes, however the embodiments are not limit in number of nodes or levels. Node 202 is one of the primary nodes on replication ring 200. Fan-out nodes 204, 214, and 216 are in communication with, and children of, primary node 202. Fan-out nodes 206 and 208 are in communication with, and children of, fan-out node 204. Fan-out nodes 210 and 212 are in communication with, and children of, fan-out node 208. Each fan-out node can have an exact copy of its parent node's data, or in some embodiments, a subset of the parent node's data.

Figure 1A:
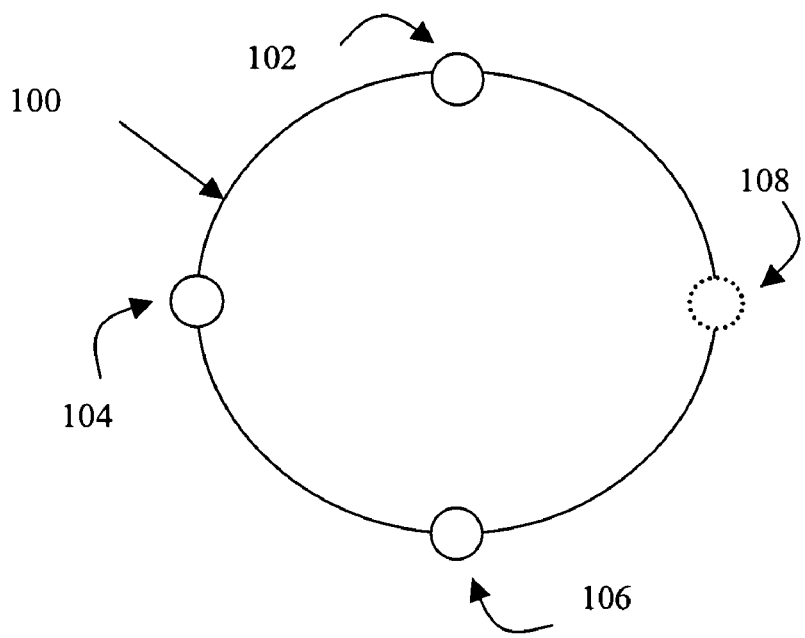
FIG. 1A is a representation of a replication ring with master nodes.
Figure 1B:
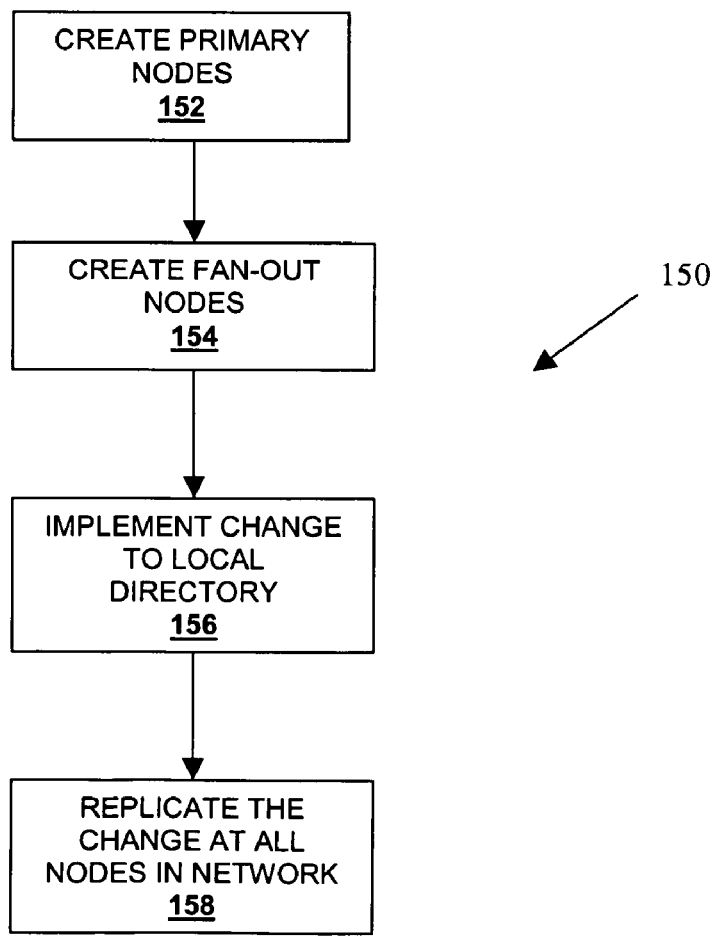
FIG. 1B is a representation of process 150, the replicating LDAP directory overview.

FIG. 1B shows an overview of the directory replication process 150. In process action 152, one or more primary nodes are created in a replication ring. One or more fan-out nodes are created as children of the primary nodes or as children of other fan-out nodes in process action 154. A change is implemented in process action 156. The change is replicated throughout the network in process action 158.

Agreement

To define the parent to child relationship between nodes in the network, a "relationship agreement" is configured. One parameter of the agreement characterizes the nature of the relationship as uni-directional or bi-directional. A uni-directional relationship is one in which changes only pass from parent to child. A bi-directional relationship is one in which changes pass from child to parent in addition to passing from parent to child. Another parameter of the agreement can define which data the parent and child share. For example, the agreement can specify that a child node possesses only a subset of the parent's data.

Other parameters of the agreement can define the types of changes that will pass between parent and child. For example, the agreement can specify to pass changes of a specific change type, changes for certain object classes, or changes for certain attribute types. In some embodiments the relationship is defined in a set of agreements. For example, data passing from parent to child can be defined in one agreement, while data passing from child to parent can be defined in another agreement.

Master Association Reconfiguration

Master association reconfiguration is the process by which the fan-out node re-associates itself. Re-association occurs when a master is no longer available (e.g. goes down, loses power). The rules of re-association are as follows.

A first rule of re-association may provide for the case in which a parent node is unavailable and the parent node is a master in the replication ring. In this case, the immediate child node of the unavailable parent can re-associate to any master in the replication ring.

A second rule of re-association may provide for the case in which the parent node that is unavailable is not in the replication ring but is a fan-out master. In this case, all the parent node's immediate children can re-associate to the parent of the unavailable master. In other words, the fan-out tree collapses.

Figure 2B:
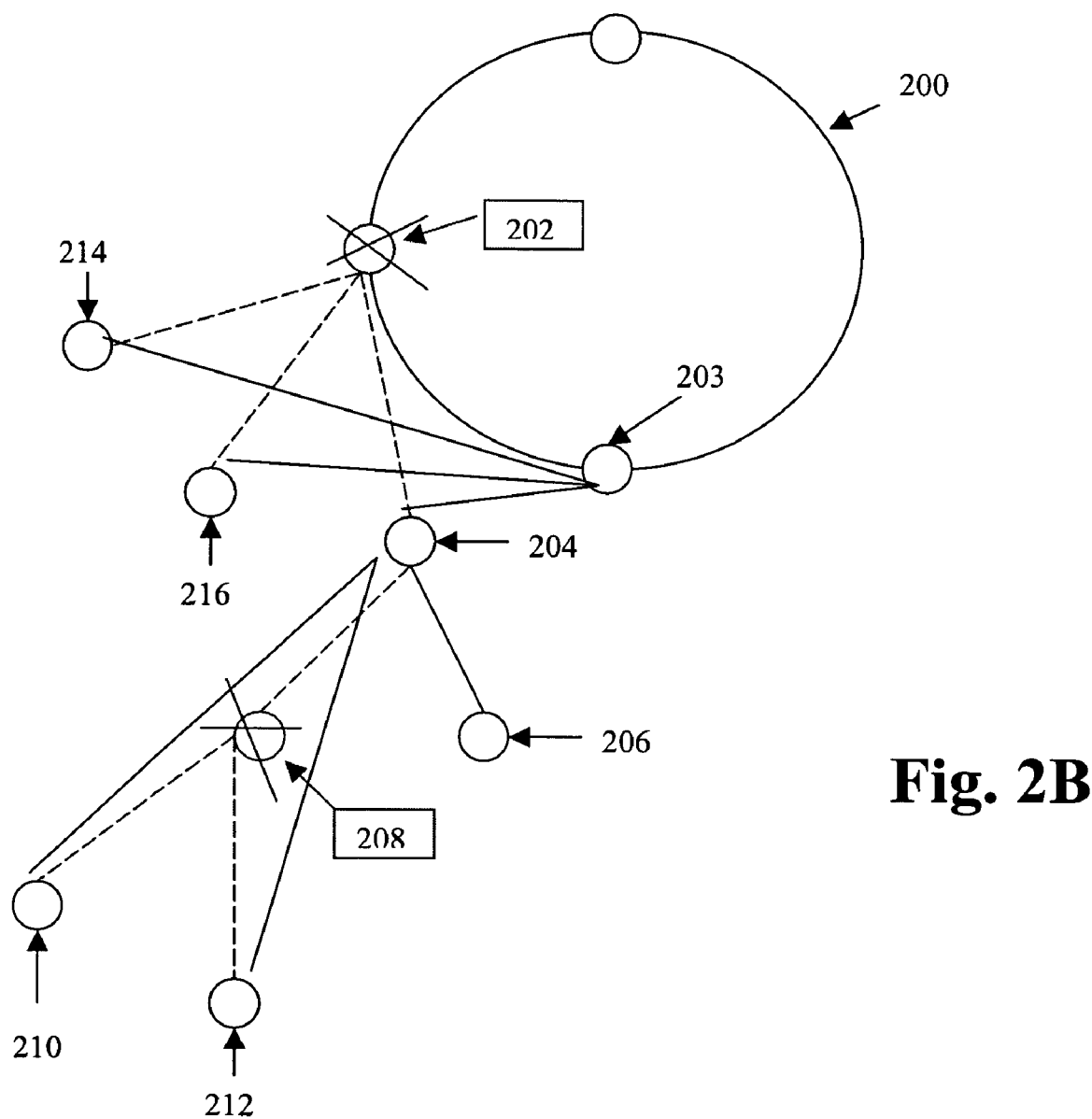
FIG. 2B is a representation of a master association reconfiguration.

This process is illustrated in FIG. 2B. For example, if node 208 lost power, child nodes 210 and 212 would re-associate to node 204, which is the parent of 208. If primary node 202 went down, child nodes 204, 214, and 216 would re-associate to primary node 203.

Change Log

Some embodiments utilize a change log. Changes are propagated throughout the replication network by directing a change log to each node. The change log records operational information and origin information. The operational information provides the receiving node the required information so that the receiving node can process the change. For example, the operational information may include effected entry(ies), effected attribute(s), and the change value(s). The origin information identifies the origin and immediate source of the change log so that the receiving node can determine whether the change needs to be propagated to its other relational nodes. For example, the origin information may include some, or all, of the following:

Type which indicates if the change log is original or regenerated

Origin Node: Node/Master where the user made the change

Origin Time: Time when the change was made

ID at Origin Node: ID for the change log where the change log originated

Regenerated Node: Node where the change was regenerated (Replication process applied the original change log and the change log was regenerated)

Regenerated Time: Time when the change was regenerated

ID at Regenerate Node: ID where the change was regenerated

Identity: Identity of user/process who performed the operation that resulted in change log creation or change log regeneration In some embodiments, the life of a change log lasts for one change at one node. Once that change is enacted at that node, the life of that particular change log is over. To continue to propagate the change throughout the network, the change log is regenerated. Each change log, regenerated or not, ceases to exist at the node once it is consumed by all its immediate child nodes. The regenerated change log includes all the same operational information as the original change log to allow the change to be implemented, however, the origin information will differ. The Identity, Regenerated Node, Regenerated Time and ID at the Regenerated Node are different for each regenerated change log, while the Origin Node, Origin Time, and ID at the Origin Node remain the same for each regeneration of the change log for a particular change.

Change Management

An LDAP information system can be used to provide a framework for the storage and retrieval of information that is used to identify and locate the details of individuals and organizations, such as telephone numbers, postal addresses, and email addresses. Recall from above that LDAP directory systems are normally organized in a hierarchical structure having entries organized in the form of a tree, which is referred to as a directory information tree ("DIT"), which may be organized to reflect political, geographic, or organizational boundaries. A unique name or ID identifies each LDAP entry, which is a collection of one or more entry attributes.

Figures 3A, 3B:
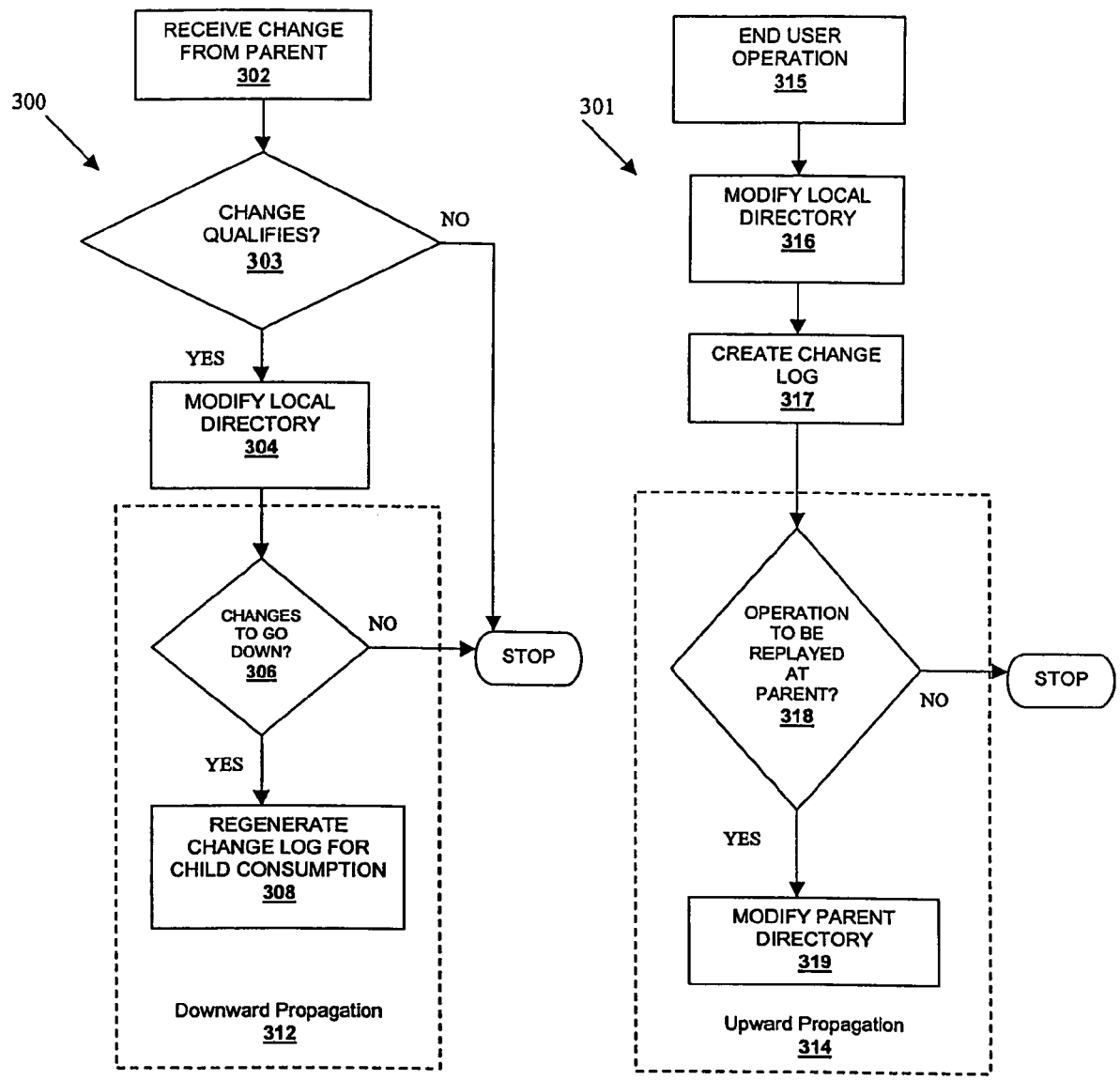
FIG. 3A is a representation of process 300, the change handling process for Fan-out replication purpose.
FIG. 3B is a representation of process 301, the operation replay process for keeping parent consistent with child.

A change to the database can come in the form of an attribute change, or an entry addition, deletion or rename. The changes can originate at any node in the system including fan-out nodes. One embodiment of process 300 is shown in FIG. 3A. In process 300 a change occurs at a node which results in change log creation or regeneration and this change log is received by the child node for its consumption. In another embodiment, when an operation takes place at a node, it is also replayed at its immediate parent, if the agreement allows, therefore realizing the operation at the concerned node and its immediate parent. This replaying process, process 301, is illustrated in FIG. 3B.

Process 300 in FIG. 3A is triggered each time a node retrieves a change from its parent/master, independent of the origin of the change. That is, it does not matter if the change at the parent/master originated at that node or was propagated from another node, the change management process is the same. A change is received in process action 302. That is, an original change log or a regenerated change log is received. The change is then evaluated as per agreement in process action 303, and if it qualifies, then it is implemented in the local directory in process action 304. If the change does not qualify, in process action 303, then the process 300 stops. Both the relationship agreement and the change log are taken into consideration when deciding whether to propagate changes. Process action 303 can also take place before the change is received by the node and for security reasons the parent does not even send it to the child if it does not qualify according to the agreement. Process 300 includes Downward Propagation Process 312, while Upward Propagation Process 314 is described in Process 301 as illustrated in FIG. 3B.

In determining whether to propagate changes down to a node's children, process action 306 in FIG. 3A considers the relationship agreement and the change log. If the change log indicates a change which falls into the realm of changes for which the relationship agreement between the child node and the parent node has been configured, and the change log has not come from the child under consideration, the change will be propagated down to that child node. If the change log indicates a change which does not fall into the realm of changes for which the relationship agreement between the child node and the parent node has been configured, or if the change came from that child node (i.e., the origin node is the child node), the change will not be propagated down to that child node. This determination is made for each child node individually. An example illustration of this process is shown in FIG. 4.

Figure 4:
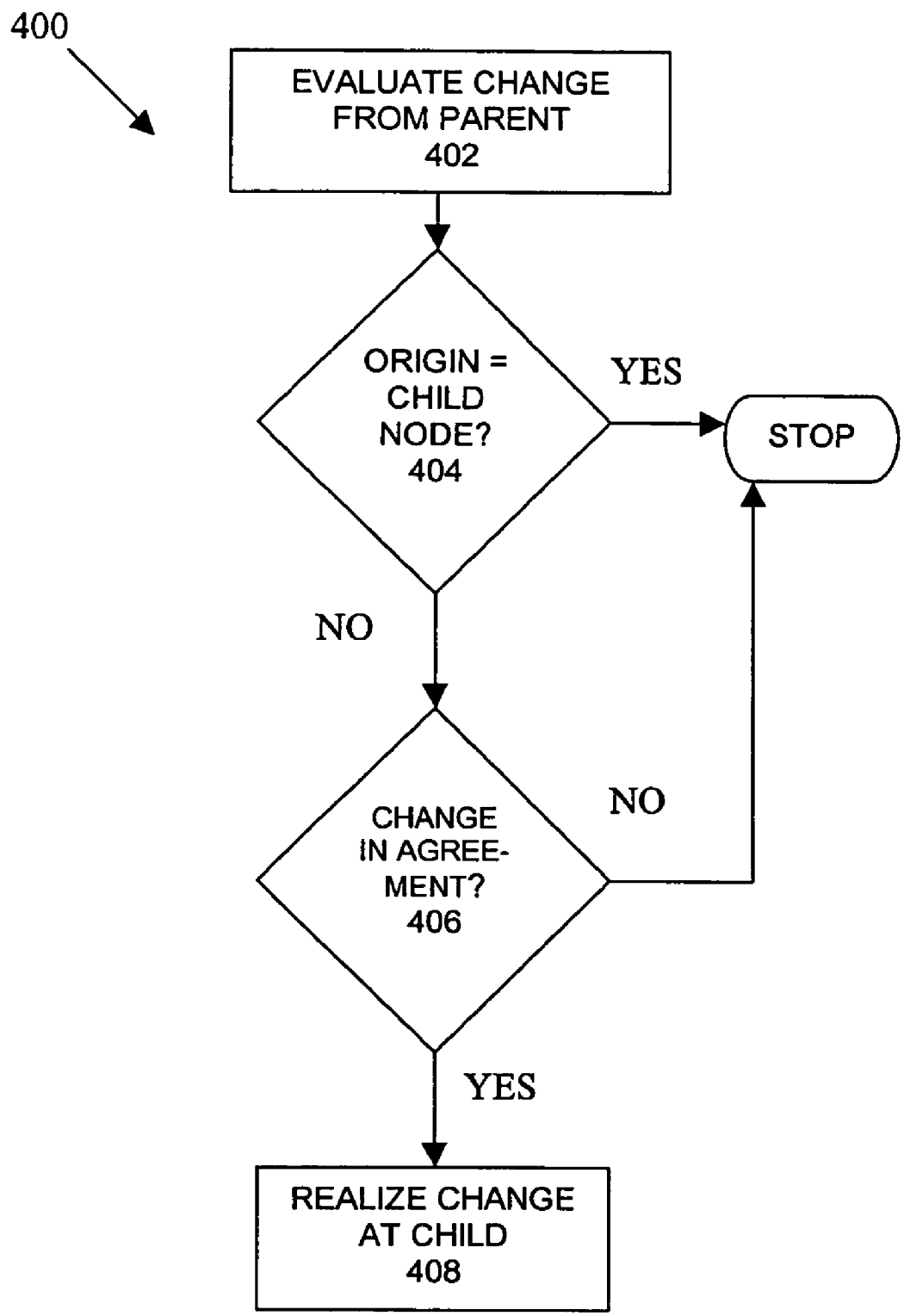
FIG. 4 is a representation of a process to determine if a change should be propagated down to a child.

FIG. 4 is a representation of a process 400 to determine if a change should be propagated down to a child. As shown in FIG. 4, a change received from a parent may be evaluated in process step 402. In process step 404, it may be determined whether the origin node for the change is the child node, i.e., it is determined whether the change came from the child node. If it is determined that the origin node for the change is the child node, the process may stop.

If it is determined that the origin node is not the child node, it may be determined in process step 406 whether the change is in the agreement between the child and the parent. In other words, it is determined whether the falls into the realm of changes for which the relationship agreement between the child node and the parent node has been configured. If it is determined that the change is not in the agreement, the process may stop.

If it is determined that the change is in the agreement, the change may be realized at the child in process action 408. For example, the change may be realized as in process step 308 of FIG. 3A.

FIG. 3B is a representation of process 301, the operation replay process for keeping parent consistent with child. Process 301 is triggered when an operation is performed at the fan-out node by an end user in process action 315. The local database is updated as a result of the operation in process action 316 and a change log is created, as it is for any directory operation, in process action 317. If the agreement for upward propagation requires the operation to be replayed at the parent, as determined by process action 318, the directory of the parent is modified in process action 319, and operation 301 may then be replayed at the parent node.

In determining whether an operation needs to be replayed at its immediate parent node, process action 318 in process 301 considers the relationship agreement and the operation. If the relationship agreement between the child node and the parent node indicates a bi-directional relationship which encompasses the operation to be replayed at the parent, then the same operation will be replayed immediately at the parent in process action 319. If the relationship agreement between the child node and the parent node does not indicate a bi-directional relationship, or the bi-directional relationship does not encompasses the changes indicated in the operation, the operation will not be replayed to the parent node and the Upward Propagation Process 314 stops.

Lower level details regarding the replication process can be found in U.S. Pat. No. 6,615,223, which is hereby incorporated by reference as if fully set forth herein.

Illustrative Example

The following example illustrates process 300 in FIG. 3A, and refers to the fan-out node in FIG. 2A. This description is for illustrative purposes only and is not meant to limit the embodiments. Each relationship can be individually configured is not limited by this example.

For illustration purposes, suppose fan-out node 208 receives a change for an operation that took place at node 204 (302). The change log received by 208 will have the origin information as node 204. The change is then evaluated and if it complies with the agreement (303) it is implemented at local directory 208 (304). It is determined that there are child nodes 210 and 212 from 208 (306) and therefore a change log is regenerated at node 208 (308). The change is then propagated down to children 210 and 212 by process 300. The regenerated change log at node 208 reflects origin information of node 204 and regenerated node information of node 208.

Each node 210 and 212 receive the change (302), evaluate if the change needs to be realized at the local directory (303) and if true, modify their local directory (304), and determine the regeneration of the change (306). Since neither node 210 nor 212 have children this downward propagation stops here.

Consider another operation that is performed at node 208 by end user (315) which triggers process 301. Operation is performed at the local node 208 (316) and a change log is created for this operation (317). It is determined that the operation at node 208 is to be replayed to its parent node 204 (318). That is, the relationship agreement for node 208 and 204 specifies a bi-directional relationship that includes the particular type of operation/data to be propagated upwards. The operation is then replayed at the parent node 204 as if node 208 is performing the operation on behalf of end-user (319) and that completes the upward change propagation.

If the change were to be propagated up to node 202, then the change is propagated throughout the replication ring 200 to keep the replication ring nodes identical. In using these embodiments a replication network can be configured with particular relationship agreements which control the propagation of changes throughout a network without requiring that each node implement each change.

System Architecture Overview

Figure 5:
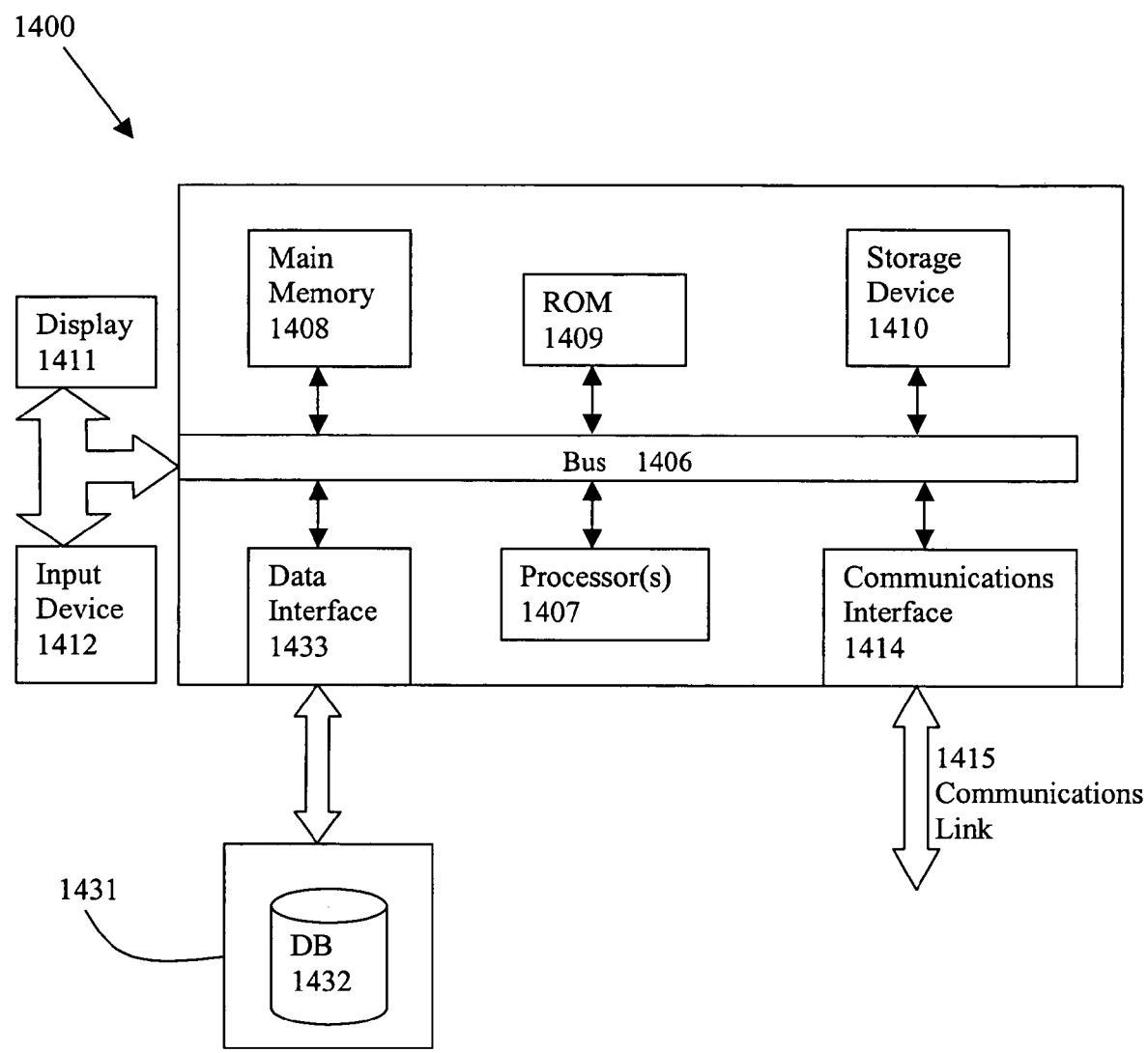
FIG. 5 is a representation a system on which highly available updateable LDAP replication occurs.

The execution of the sequences of instructions required to practice the invention may be performed in embodiments by a computer system 1400 as shown in FIG. 5. In an embodiment, execution of the sequences of instructions required is performed by a single computer system 1400. According to other embodiments, two or more computer systems 1400 coupled by a communication link 1415 may perform the sequence of instructions required in coordination with one another. In order to avoid needlessly obscuring the embodiments, a description of only one computer system 1400 will be presented below; however, it should be understood that any number of computer systems 1400 may be employed.

A computer system 1400 according to an embodiment will now be described with reference to FIG. 5, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a mode, or the communication link 1415 may be the Internet, in which case the communication interface 1414 may be a wireless modem, a digital modem a cable model or an network card.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software. Logic refers to hardware, software or any combination of the two.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements. It will, however, be evident that various modifications and changes may be made thereto without departing from the broader spirit and scope. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer-implemented method for replicating LDAP directories in a distributed database system, the distributed database system comprising a plurality of nodes communicating via a replication network comprising at least one replication ring, the method comprising:

implementing a change to the LDAP directory received at a node of the replication network, the replication network comprises a fan-out node, wherein implementing the change comprises creating one or more logs, the one or more logs further comprising a change log, the one or more logs comprising change information detailing operation information to implement the change and origin information detailing the node at which the change originated;

replicating, by using a processor, the change at one or more other nodes in the replication network based at least in part upon one or more relationship agreements between the one or more other nodes and the node, wherein the one or more relationship agreements specify the types of changes that pass between the node and the one or more other nodes in the replication network and are configured to control whether to propagate the change to a child node or a parent node based at least in part upon comparing the operation information with an relationship agreement; and storing the change in a storage area of a volatile or non-volatile computer-usable medium or displaying the change on a display device.

2. The method of claim 1, wherein the relationship agreement comprises:

a relationship type, the type being uni-directional or bi-directional;

a set of data included in the child replication set; and a set of rules describing the operations permitted to be propagated between child and parent.

3. The method of claim 1, wherein implementing the change further comprises:

modifying a database based at least in part upon the change log.

4. The method of claim 3, wherein replicating the change comprises:
   determining when the change is to be propagated to one or more fan-out nodes; and
   regenerating the change log when the change is to be propagated to one or more fan-out nodes.

5. The method of claim 4, wherein determining when the change is to be propagated to one or more fan-out nodes comprises:
   determining when the change is to be propagated to one or more child nodes; and
   determining when the change is to be propagated to a parent node.

6. The method of claim 5, wherein determining when the change is to be propagated to one or more child nodes comprises:
   comparing origin information of the change log to a node under consideration;
   comparing operation information of the change log to a relationship agreement of the node under consideration and a parent of the node under consideration to determine when the operation is permitted;
   propagating the change to the node under consideration when the origin information indicates that the change did not come from the child and when the operation is permitted.

7. The method of claim 5, wherein determining when the change is to be propagated to the parent node comprises:
   determining that the relationship to the parent is bi-directional; and
   determining that the operation information of the change log is permitted by the relationship agreement.

8. The method of claim 5, further comprising:
   when the change is to be propagated to the parent node, replaying the change at the parent.

9. The method of claim 1 further comprising:
   re-associating a child node to a new master.

10. The method of claim 9, wherein re-associating a child node to a new master comprises:
    when the child's original master is a primary node, re-associating the child node to another primary node; and
    when the child's original master is not a primary node, re-associating the child node to the parent of the child's original master.

11. A volatile or non-volatile computer-usable storage medium containing instructions thereon, the instructions being executable by a processor to cause the computer to perform a computer-implemented method for replicating LDAP directories in a distributed database system, the distributed database system comprising a plurality of nodes communicating via a replication network comprising at least one replication ring, the method comprising:
    implementing a change to the LDAP directory received at a node of the replication network, the replication network comprises a fan-out node, wherein implementing the change comprises creating one or more logs, the one or more logs comprises a change log, the one or more logs further comprising change information detailing operation information to implement the change and origin information detailing the node at which the change originated;
    replicating, by using the processor, the change at one or more other nodes in the replication network based at least in part upon one or more relationship agreements between the one or more other nodes and the node, wherein the one or more relationship agreements specify the types of changes that pass between the node and the one or more other nodes in the replication network and are configured to control whether to propagate the change to a child node or a parent node based at least in part upon comparing the operation information with an relationship agreement; and
    displaying the change on a display device or storing the change.

12. The medium of claim 11, wherein the relationship agreement comprises:
    a relationship type, the type being uni-directional or bi-directional;
    a set of data included in the child replication set; and
    a set of rules describing the operations permitted to be propagated between child and parent.

13. The medium of claim 11, wherein implementing the change further comprises:
    modifying a database based at least in part upon the change log.

14. The medium of claim 13, wherein replicating the change comprises:
    determining when the change is to be propagated to one or more fan-out nodes; and
    regenerating the change log when the change is to be propagated to one or more fan-out nodes.

15. The medium of claim 14, wherein determining when the change is to be propagated to one or more fan-out nodes comprises:
    determining when the change is to be propagated to one or more child nodes; and
    determining when the change is to be propagated to a parent node.

16. The medium of claim 15, wherein determining when the change is to be propagated to one or more child nodes comprises:
    comparing origin information of the change log to a node under consideration;
    comparing operation information of the change log to a relationship agreement of the node under consideration and a parent of the node under consideration to determine when the operation is permitted;
    propagating the change to the node under consideration when the origin information indicates that the change did not come from the child and when the operation is permitted.

17. The medium of claim 15, wherein determining when the change is to be propagated to the parent node comprises:
    determining that the relationship to the parent is bi-directional; and
    determining that the operation information of the change log is permitted by the relationship agreement.

18. The medium of claim 15, further comprising:
    when the change is to be propagated to the parent node, replaying the change at the parent.

19. The medium of claim 11 further comprising:
    re-associating a child node to a new master.

20. The medium of claim 19, wherein re-associating a child node to a new master comprises:
    when the child's original master is a primary node, re-associating the child node to another primary node; and
    when the child's original master is not a primary node, re-associating the child node to the parent of the child's original master.

21. A distributed database system comprising:
one or more nodes communicating via a replication network comprising at least one replication ring and a fan-out node, wherein the system further comprising:
a processor for:
  implementing a change to the LDAP directory received at a node of the replication network, wherein implementing the change comprises creating one or more logs, the one or more logs comprising a change log, the one or more logs further comprising change information detailing operation information to implement the change and origin information detailing the node at which the change originated; and
  replicating the change at one or more other nodes in the replication network based at least in part upon one or more relationship agreements between the one or more other nodes and the node, wherein the one or more relationship agreements specify the types of changes that pass between the node and the one or more other nodes in the replication network and are configured to control whether to propagate the change to a child node or a parent node based at least in part upon comparing the operation information with an relationship agreement; and
  a volatile or non-volatile computer-usable medium for storing the change in a storage area or a display device for displaying the change.

22. The system of claim 21, wherein the relationship agreement comprises:
  a relationship type, the type being uni-directional or bi-directional;
  a set of data included in the child replication set; and
  a set of rules describing the operations permitted to be propagated between child and parent.

23. The system of claim 21, wherein the act of implementing the change further comprises:
  modifying a database based at least in part upon the change log.

24. The system of claim 21, the processor further configured for:
  re-associating a child node to a new master, wherein the re-associating a child node to a new master comprises:
  when the child's original master is a primary node, re-associating the child node to another primary node; and
  when the child's original master is not a primary node, re-associating the child node to the parent of the child's original master.

* * * * *

UNITED STATES PATENT AND TRADEMARK OFFICE
CERTIFICATE OF CORRECTION

PATENT NO. : 7,734,585 B2
APPLICATION NO. : 11/292949
DATED : June 8, 2010
INVENTOR(S) : Amit Sharma et al.

It is certified that error appears in the above-identified patent and that said Letters Patent is hereby corrected as shown below:

In column 1, line 42, delete "Consultantif" and insert -- Consultatif --, therefor.

Signed and Sealed this
Second Day of August, 2011

David J. Kappos
*Director of the United States Patent and Trademark Office*